United States Patent
Santhanam et al.

(10) Patent No.: US 12,432,083 B2
(45) Date of Patent: *Sep. 30, 2025

(54) CAMERA FORMAT SELECTION

(71) Applicant: Apple Inc., Cupertino, CA (US)

(72) Inventors: Karthick Santhanam, Campbell, CA (US); Eric L. Chien, Sunnyvale, CA (US); Christopher M. Garrido, Santa Clara, CA (US); Kyle W. Horn, Chicago, IL (US); Ian J. Baird, San Jose, CA (US); Qian Sun, Sunnyvale, CA (US); David L. Biderman, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,893

(22) Filed: Mar. 6, 2024

(65) Prior Publication Data
US 2024/0214233 A1    Jun. 27, 2024

Related U.S. Application Data (63) Continuation of application No. 17/956,764, filed on Sep. 29, 2022, now Pat. No. 11,949,529.

(60) Provisional application No. 63/256,616, filed on Oct. 17, 2021.

(51) Int. Cl.
*H04L 12/18*    (2006.01)
*H04N 23/951*    (2023.01)

(52) U.S. Cl.
CPC ....... *H04L 12/1822* (2013.01); *H04N 23/951* (2023.01)

(58) Field of Classification Search
CPC ............ H04L 12/1822; H04L 12/1827; H04L 51/066; H04N 23/951; H04N 7/147
See application file for complete search history.

(56) References Cited

U.S. PATENT DOCUMENTS

2002/0126211 A1* 9/2002 Kitajima ................ H04N 23/58
                                                          348/E5.042
2006/0059025 A1* 3/2006 Kato ...................... G06Q 10/02
                                                          705/5

(Continued)

OTHER PUBLICATIONS

International Search Report and Written Opinion from PCT/US2022/045705, dated Feb. 6, 2023, 11 pages.

*Primary Examiner* — Abdullahi E Salad
(74) *Attorney, Agent, or Firm* — BAKERHOSTETLER (57) ABSTRACT

The subject technology receives, at a local device, a requested camera format based on specifications of a display associated with a remote device. The remote device and the local device are devices participating in a video conference. The requested camera format includes a first resolution. Camera formats supported by a camera associated with the local device are determined. If a second resolution of a first camera format matches among the supported camera formats matches with the first resolution, the first camera format is selected for capturing the video stream by the camera. Otherwise, a second camera format among the supported camera formats is determined for capturing the video stream so as to maximize a field of view of the video stream relative to other camera formats supported by the camera.

20 Claims, 5 Drawing Sheets

(56) References Cited

U.S. PATENT DOCUMENTS

| | | | |
|---|---|---|---|
| 2012/0050610 A1* | 3/2012 | Zhao | H04N 7/148 |
| | | | 348/E7.003 |
| 2014/0078244 A1* | 3/2014 | Kitazawa | H04N 7/147 |
| | | | 348/14.08 |
| 2014/0267541 A1* | 9/2014 | Atkinson | H04N 7/141 |
| | | | 348/14.01 |
| 2015/0103138 A1* | 4/2015 | Lin | H04L 65/00 |
| | | | 348/14.12 |
| 2016/0300918 A1* | 10/2016 | Fang | H01L 29/0653 |
| 2016/0309118 A1* | 10/2016 | Li | H04N 7/15 |
| 2018/0176506 A1* | 6/2018 | McNelley | H04N 7/142 |

* cited by examiner

CAMERA FORMAT SELECTION

CROSS REFERENCE TO RELATED APPLICATIONS

This application is a continuation of U.S. patent application Ser. No. 17/956,764, entitled "Camera Format Selection," filed on Sep. 29, 2022, which, in turn, claims the benefit of priority to U.S. Provisional Patent Application No. 63/256,616, entitled "Camera Format Selection," filed on Oct. 17, 2021, the disclosures of which are hereby incorporated herein in their entirety.

TECHNICAL FIELD

The present description relates generally to audio-video conferencing, and in particular to video capture during an audio-video conference call.

BACKGROUND

Video conference calls involve capturing video from a transmitting device, transmitting it to a receiving device in real-time, and displaying it on a display of the receiving device. At the local device, the video is captured based on the specifications of a camera on or associated with the transmitting device. The video is transmitted to the receiving device and displayed on a display associated with the remote device based on the specifications of the display associated with the remote device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Audio-video conferencing provides for the reception and transmission of audio and/or video signals by user devices (e.g., at different locations), for communication between users in real-time. In some cases, two users may utilize audio-video conferencing to communicate with each other in one-to-one communication at their respective devices.

The video streams used during audio-video conferencing calls are captured by a camera (i.e., a local or a transmitting device camera) associated with a transmitting device, using a format that may be based on or determined by e.g., orientation, aspect ratio and resolution of the physical sensor the local camera, or set by a user or an application of the local device. The captured video is then processed based on the specifications and attributes of the display associated with the receiving (i.e., remote) device and transmitted to the receiving device, where it is then displayed in real-time to enable video communication between the two devices.

For example, in some instances, the physical camera sensor of a transmitting device may have an aspect ratio of 16:9 (or 9:16, depending on the orientation) and a resolution of 1920×1080 (or correspondingly, 1080×1920). In such instances, during an audio-video conference, the video is captured at 1920×1080 (or correspondingly, 1080×1920). However, if a receiving device has a display that has an aspect ratio of 4:3, the captured video is cropped in order to provide the appropriate aspect ratio, resulting, for example, in a resolution of 1440×1080. Consequently, there is a loss of resolution from reduced sensor utilization. Moreover, the reduced sensor utilization also reduces the field of view.

Figure 1:
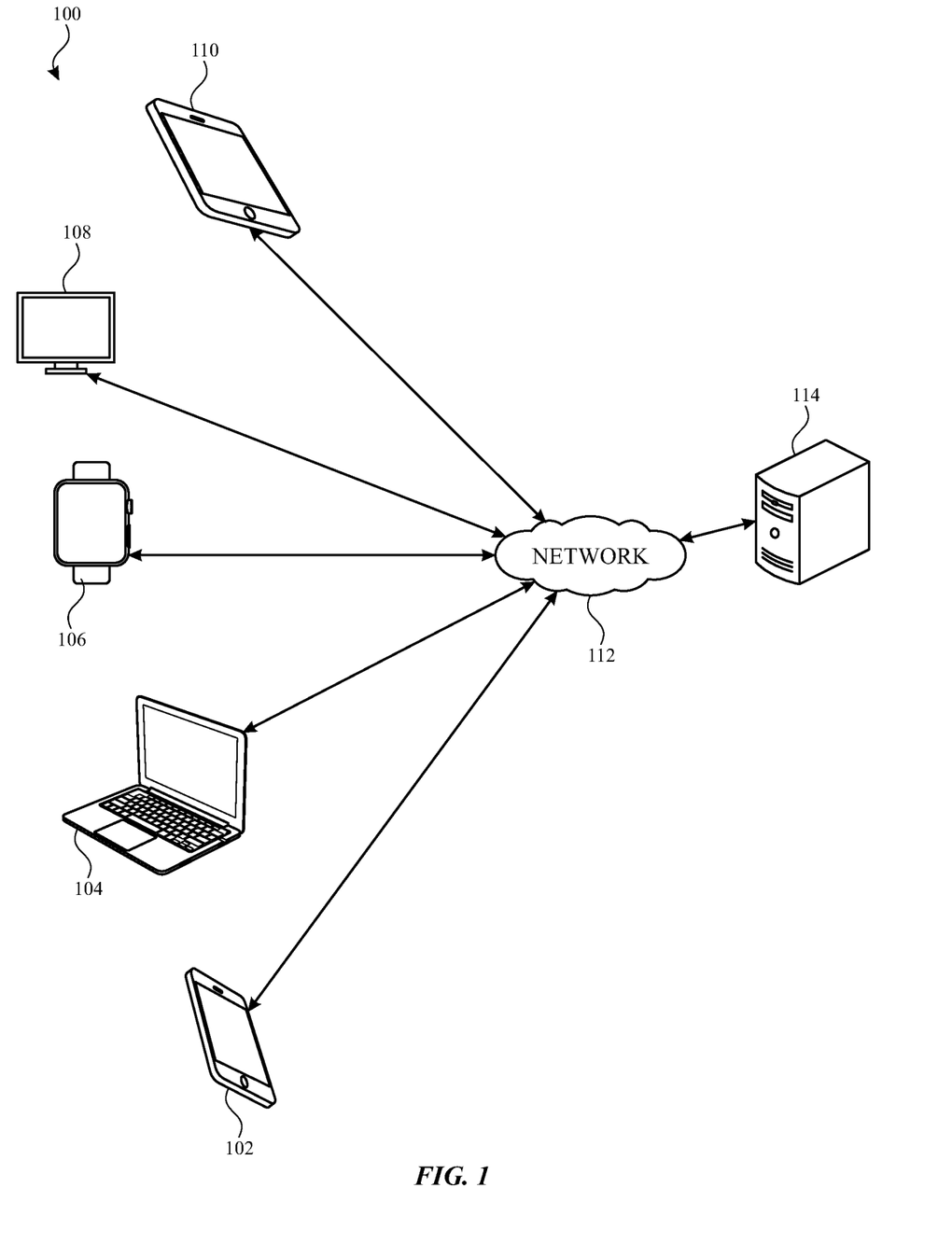
FIG. 1 illustrates an example network environment for audio-video conferencing in accordance with one or more implementations.

FIG. 1 illustrates an example network environment for multiway audio-video conferencing in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (hereinafter 102-110), a network 112 and a server 114. The network 112 may communicatively (directly or indirectly) couple, for example, any two or more of the electronic devices 102-110 and the server 114. In one or more implementations, the network 112 may be an interconnected network of devices that may include, and/or may be communicatively coupled to, the Internet. For explanatory purposes, the network environment 100 is illustrated in FIG. 1 as including electronic devices 102-110 and a single server 114; however, the network environment 100 may include any number of electronic devices and any number of servers.

One or more of the electronic devices 102-110 may be, for example, a portable computing device such as a laptop computer, a smartphone, a smart speaker, a tablet device, a wearable device such as a smartwatch, a band, and the like, or any other appropriate device that includes, for example, a camera and one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, the electronic device 108 is depicted as a desktop computer, and the electronic device 110 is depicted as a tablet computer.

Figure 3A:
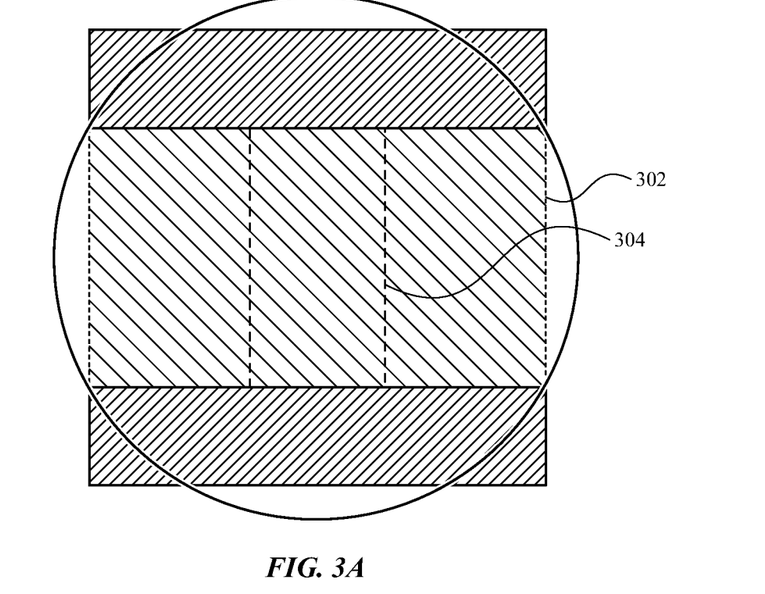
FIG. 3A illustrates an example of a video feed modified before transmission based on a format supported by a receiving device.
Figure 3B:
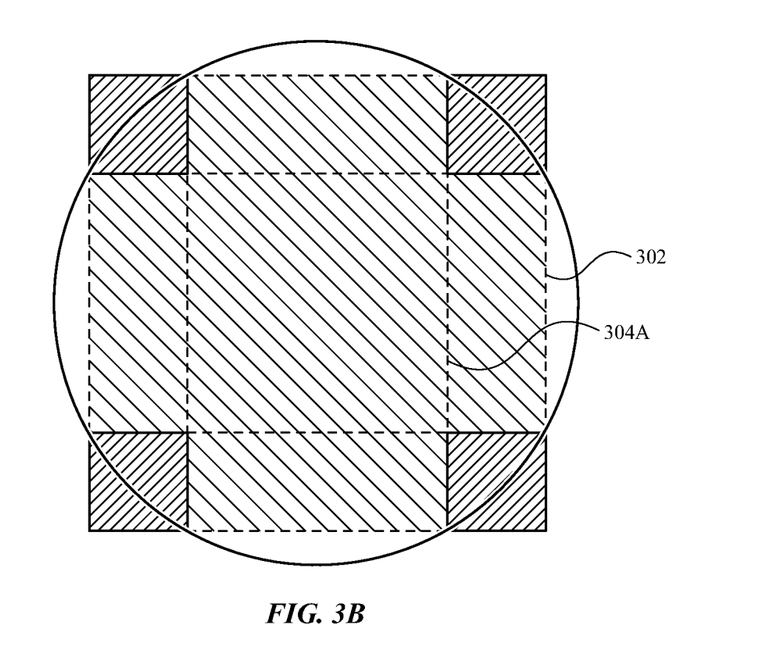
FIG. 3B illustrates an example of a video feed captured based on a format supported by a receiving device in accordance with one or more implementations.

The electronic devices 102-110 may be configured to participate in audio-video conferencing, for example, where any two of the electronic devices 102-110 may participate in a conversation in which video content streams are transmitted between the participant devices. In the example of FIG. 1, the electronic device 104 (e.g., a laptop) may participate in a conversation with a video stream with the electronic device 102. As discussed below with reference to FIG. 3, each of the participant devices may be have a camera having a physical sensor that is configured to capture digital images at a certain pixel density, resolution and orientation. Further each of the participant devices may have a display that is configured to display images at a certain orientation and resolution. Moreover, as the video stream is transmitted from the transmitting device (also referred to herein as the local device) to a receiving device (also referred to herein as a remote device), the transmitting device may be configured to enable changing certain attributes (e.g., filtering, binning, and the like), to increasing the quality and/or efficiency of the transmission feed.

Each of the electronic devices 102-110 may be, and/or may include all or part of, the device discussed below with respect to FIG. 2, and/or the electronic system discussed below with respect to FIG. 10.

The server 114 may be, and/or may include all or part of the device discussed below with respect to FIG. 2, and/or the electronic system discussed below with respect to FIG. 6. The server 114 may include one or more servers, such as a cloud of servers, that may be used to facilitate in audio-video conferencing between the electronic devices 102-110. For explanatory purposes, a single server 114 is shown and discussed with respect to various operations, such as facilitating in audio-video conferencing. However, these and other operations discussed herein may be performed by one or more servers, and each different operation may be performed by the same or different servers.

Figure 2:
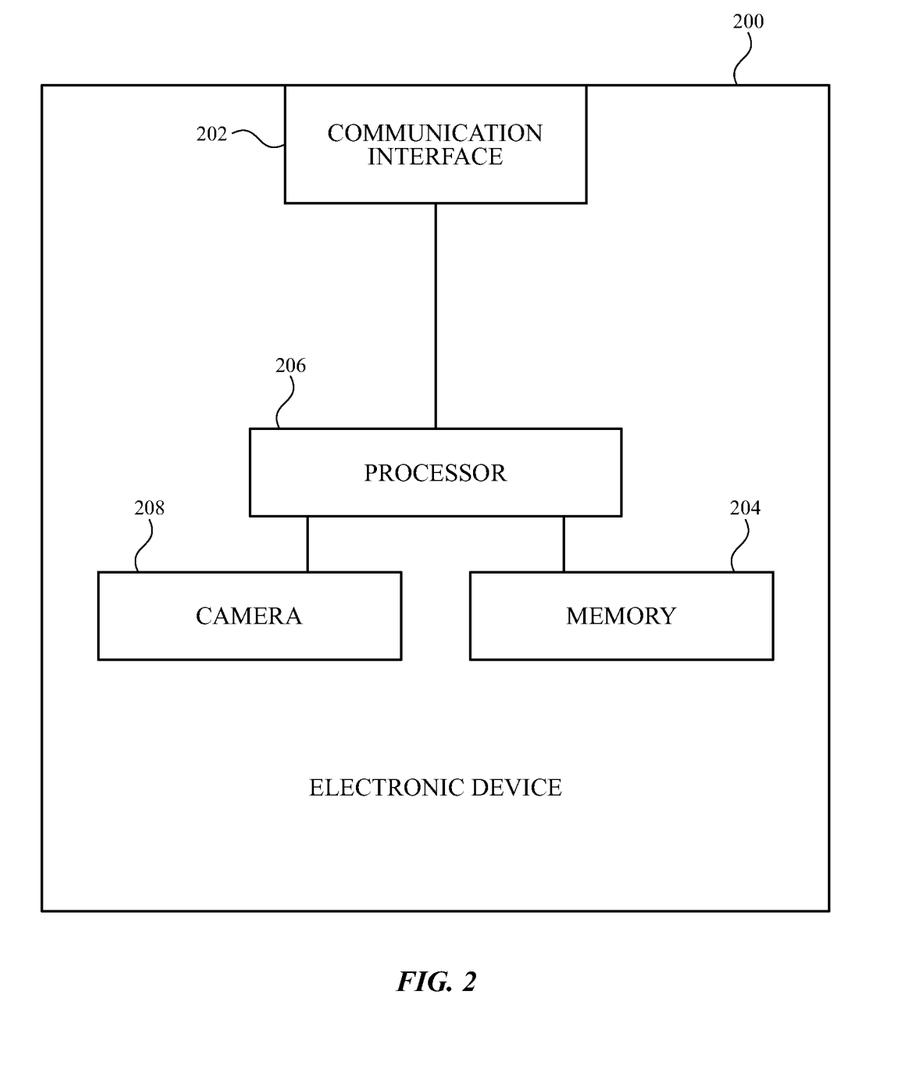
FIG. 2 illustrates an example device that may implement a system for audio-video conferencing in accordance with one or more implementations.

FIG. 2 illustrates an example device that may implement a system for multiway audio-video conferencing in accordance with one or more implementations. For example, the device 200 of FIG. 2 can correspond to any of the electronic devices 102-110, or to the server 114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement architecture(s) for audio-video conferencing using as discussed further below with respect to FIGS. 3-5.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-110, the memory 204 may store an application (e.g., an audio-video conferencing application) which is configured to facilitate in providing and receiving content streams and/or parity streams as part of an audio-video conference. In one or more implementations, the audio-video conferencing application may be part of or otherwise incorporated within the operating system of the electronic devices 102-110.

In one or more implementations, in a case where the device 200 corresponds to the server 114, the memory 204 may store one or more components configured to work in conjunction with the above-mentioned device application (e.g., the audio-video conferencing application), to facilitate in providing for audio-video conferencing between the participant devices (e.g., the electronic devices 102-110).

The communication interface 206 may include suitable logic, circuitry, and/or code that enables wired or wireless communication, such as between any of the electronic devices 102-110 and the server 114 over the network 112. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

In one or more implementations, the device 200 includes a camera 208, having a physical sensor (e.g., a CCD sensor) and associated circuitry to enable the device 200 to capture images with certain attributes such as, for example, a certain orientation, aspect ratio, and resolution. The associated circuitry may also perform post-capture processing of the images captured by the physical sensor of the camera 208. In one or more implementations, the physical sensor of the camera 208 is a square sensor that captures images at a 1:1 aspect ratio, and the associated circuitry then processes the images into a preferred orientation and resolution.

As discussed herein, when a local device (e.g., an electronic device 104), is participating in an audio-video conference with a remote device (e.g., an electronic device 110), there may be a mismatch between a default and/or user (or application) selected camera format of the camera of the local device and a camera format requested by the remote device based on the specifications of the display of the remote device. For example, while the default and/or user (or application) selected camera format of the local device may include a certain orientation (e.g, landscape orientation), a certain aspect ratio (e.g., 16:9) and a certain resolution (e.g., 1920×1080), the display of the remote device may be configured to display the images in a different orientation (e.g., a portrait orientation), at a different aspect ratio (e.g., 4:3) and/or at a different resolution (e.g., 768× 1024). Thus, when the local device and the remote device participate in a video conference, the remote device may request a camera format that is different from the camera format of the camera of the local device.

In such situations, the video feed transmitted from the local device is processed before transmitting to the remote device by cropping the video captured at the camera format of camera of the local device to fit to request camera format. Thus, the processing may include, but is not limited to, application of attributes necessary for transmission to the remote device (e.g., cropping the video to match the orientation and the aspect ratio supported by the remote device), and optionally, application attributes preferred by the video conferencing application and/or the remote device (e.g., binning, modulation of frame rate, SIFR, and the like).

FIG. 3A illustrates an example of how a video feed is processed before transmission based on a format supported by a receiving device. In the example shown in FIG. 3A, the camera of the local device is designed to capture images in a camera format having orientation and resolution, shown by the rectangle 302 (i.e., in a landscape mode at an aspect ratio of 16:9 at a resolution of 1920×1080 resulting in a video at 2.07 MP). In this example, however, the receiving device supports display of a video shown by the rectangle 304, in a portrait mode at an aspect ratio of 9:16. Thus, during a video conference between the local device and the remote device, the remote device requests a camera format based on the display specifications as shown by the rectangle 304. Accordingly, before transmit the video to the remote device, the local device processes the captured video by cropping the video to a resolution of 592×1080 in order to enable the display of the remote device to display the video is a portrait mode at an aspect ratio of 9:16. Because the size of the physical sensor of the camera of the local device is fixed, as shown in FIG. 3A, the cropping of the video results in a resolution of 592×1080, resulting a video at 0.64 MP. Consequently, a substantial portion of the captured images is lost in the processing and not transmitted to the remote device, thereby reducing the field of view.

Accordingly, aspects of the present disclosure are based on the realization that the losses caused by processing the captured video before transmission because of a mismatch between the camera format supported by a local device and the camera format requested by the remote device may be alleviated by selecting a new camera format at which the video is captured at the local device based on a requested camera format such that the selected camera format maximizes a field of view of the video stream relative to other camera formats supported by the camera of the local device. FIG. 3B illustrates an example of a video feed captured in a camera format for the camera of the local device selected based on a camera format requested by the remote device in accordance with one or more implementations.

In FIG. 3B, as in FIG. 3A, the camera format (including the orientation and resolution) using which the camera of the local device captures images is shown by the rectangle 302. However, in case of a mismatch between the camera format of the local device and the camera format requested by the remote device instead of cropping the video captured at the local device based on the requested camera format (e.g., having portrait orientation as shown in FIG. 3B) by the remote device, the video, in this instance, is captured at an alternate camera format supported by the camera of local device. The alternate camera format have, for example, include a change in orientation while keeping the same resolution. Thus, instead of capturing the images in a landscape mode, the local device captures the images in a portrait mode supported by the remote device as shown by the rectangle 304A.

Accordingly, the captured video has an orientation of 9:16 at a resolution of 1080×1920 resulting in a video at 2.07 MP. Consequently, the resolution of the video being transmitted is not lost (or the loss in resolution is reduced). As can be seen in FIG. 3B, aspect ratio is changed within the square sensor to enable utilization of as much sensor surface as allowable by the aspect ratio, thereby maximizing the sensor utilization and improving resolution and light sensitivity. Thus, despite the mismatch between the camera orientation and the display orientation, the field of view is not compromised.

Thus, in one or more implementations, the local device may include a camera that supports a plurality of camera formats which may, e.g., be listed in a look-up table. Examples of camera formats supported by a square sensor include, but are not limited to: 16:9 at a resolution of 1920×1080; 4:3 at a resolution of 1760×1328; 1:1 at a resolution of 1552×1552; 3:4 at a resolution of 1328×1760; and 9:16 at a resolution of 1080×1920. Other camera formats based on different aspect ratios and resolutions are contemplated.

Figure 4:
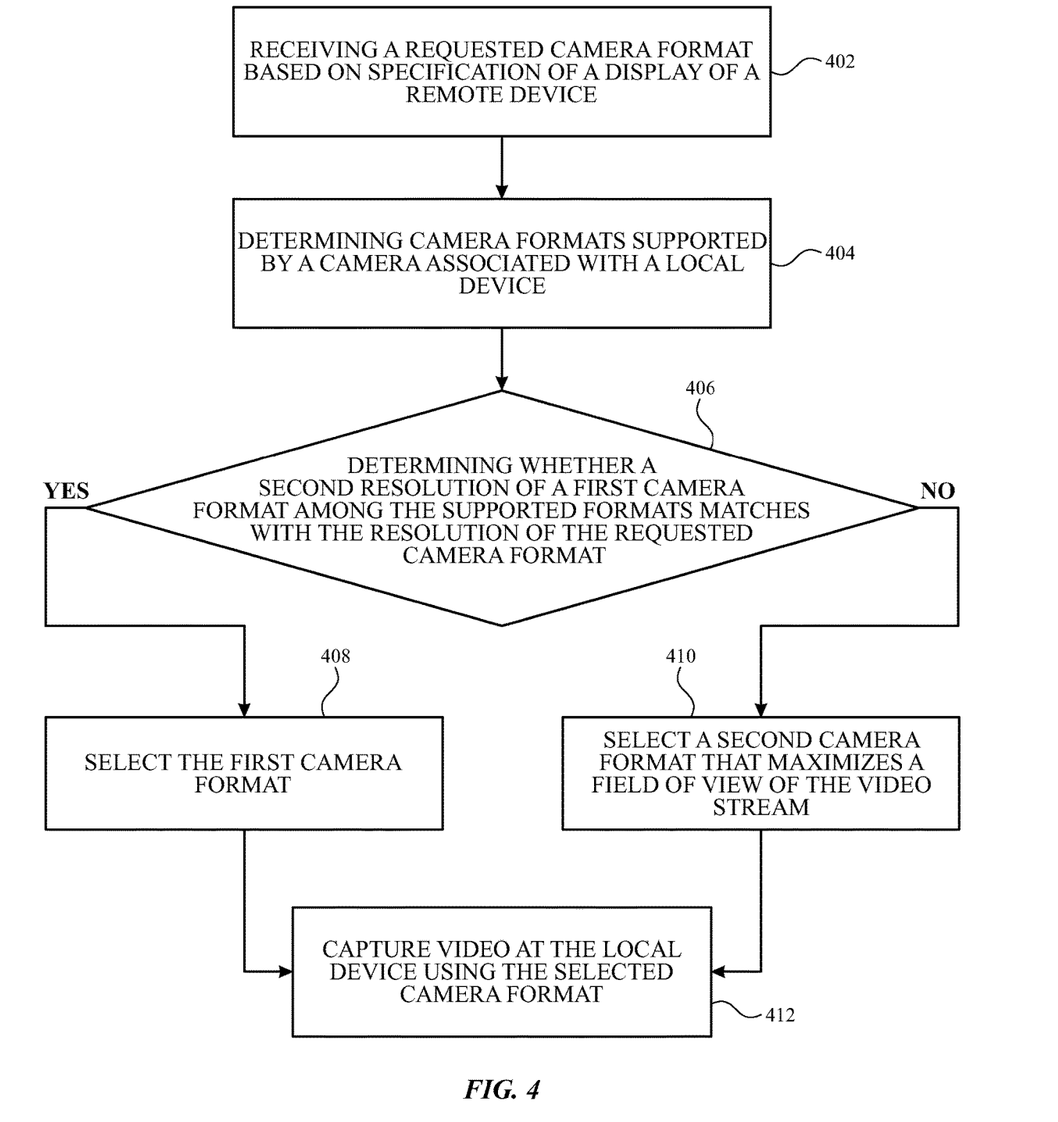
FIG. 4 illustrates a flow diagram of an example process for selecting a camera format for capturing digital images based on a format preferred by a receiving device in accordance with one or more implementations.

FIG. 4 illustrates a flow diagram of an example process for selecting a camera format for capturing digital images based on a format requested by a receiving device in accordance with one or more implementations. Thus, in one or more implementations the process may include, at 402, receiving, at the local device, a requested camera format based on specifications of a display associated with a remote device with which the local device is participating in a video conference. The requested camera format may include a first resolution, and may additionally specify, e.g., an orientation and an aspect ratio, of the video stream the remote device can receive.

In one or more implementations, the remote device may have a display that supports certain aspect ratios and orientations. For example, a tablet device may have a display with a default orientation set to portrait with an aspect ratio of 3:4, while a smartphone device may have a display with default orientation set to portrait with an aspect ratio of 9:16. However, a user of the remote device may prefer to use the device in an orientation that is different from the default orientation. For example, the user may select, for the purposes of the video conference, to display the video on a laptop device in portrait mode at an aspect ratio of 9:16.

Thus, when participating in a video conference with the local device, the remote device may request a camera format based on the specification of the display of the remote device. In one or more implementations, the specification of the display of the remote device may be based on a hardware constraint of the remote device. Alternatively or additionally, the specification of the display of the remote device may be set by a user of the remote device and/or an application being implemented by the remote device for participating in the video conference.

The process further includes, at 404, determining camera formats supported by the camera associated with the local device. In one or more implementations, the camera formats supported by the camera of the local device may be listed in look-up table. Thus, determining the supported camera formats may include a query of the look-up table. Alternatively or additionally, the supported camera format may be estimated based on the size of the physical sensor of the local device camera and the requested camera format so as to maximize the field of view of the video stream captured by the local device camera.

In one or more implementations, the camera formats supported by the camera of the local device may be based on preferences set by the local device (e.g., as device defaults) or by a user of the local device. For example, in one or more implementations, the camera of the local device may have a square sensor designed to capture images at a resolution of 1920×1920. However, based on the specifications of the local device, the camera may be preset to capture images in a landscape mode (e.g., for a laptop having a display in a landscape mode) or a portrait mode (e.g., for a smartphone which is typically used in a portrait mode). Similarly, the camera may be preset to capture images at a certain aspect ratio (e.g., 4:3 for a tablet device, or 16:9 for a desktop device with a widescreen) based on the specifications of the local device.

In some implementations, a user of the local device may select a camera format based on user preferences. For example, in some instances, even though a laptop device may have a default camera preset to capture images in a landscape mode, the user may prefer to capture images in a portrait mode. In such instances, the local device may enable the user to change camera format so as to capture images in a portrait mode at an aspect ratio selected by the user.

Thus, in one or more implementations, determining camera formats supported by the camera of the local device may include determining the camera formats set by the local device and/or by the user of the local device.

The method further determines, at 406, whether a second resolution of a first supported camera format supported by the local device matches the first resolution as requested by the remote device at 402. In one or more implementations, at 406, the method may, alternatively or additionally, determine whether the orientation and aspect ratio at which the camera of the local device captures images (whether set by the device as a default or modified by the user of the local device, e.g., for the purposes of participating in the video conference), matches the orientation and aspect ratio requested by the remote device.

If it is determined that the first camera supported format matches with the camera format requested by the remote device (in particular, if the second resolution of the first supported camera format matches with the first resolution of the requested camera format), the video stream is captured at the local device using the first camera format and transmitted to the remote device.

If, however, the it is determined that none of the supported camera formats supported by the local device match with the requested camera format requested by the remote device, at 410, a second supported camera format is determined such that the field of view of the video stream captured at the local device is maximized relative to other supported camera formats. The video stream may then be captured, at 412, using the second supported camera format and transmitted to the remote device.

In one or more implementations, the second supported camera format may be selected after receiving the specifications of the display of the remote device using a look-up table that lists all the camera formats supported by the local device as described herein.

However, in some instances, the display of the remote device may be set to a non-standard specification based on device constraints or user preferences. Consequently, the requested camera format received from the remote device may not be available in the look-up table. In such instances, the second supported camera may be estimated by computing a suitable aspect ratio and orientation that maximizes the field of view of the captured video stream.

For example, in a particular instance, the display device may request (e.g., based on a user preference), a camera format having a landscape orientation at an aspect ratio of 4:3 and a resolution of 1664×1248. In such an instance, for a local device having a square camera sensor having a resolution of 1920×1920, the second supported camera format may be estimated to have a resolution of 1920×1440 while maintaining the landscape orientation and a 4:3 aspect ratio. Such a second supported camera format maximizes the field of view of the captured video stream while matching the aspect ratio and orientation requested by the remote device. The captured video may then be cropped before transmitting to the remote device so as to match the resolution supported by the remote device.

In one or more implementations, the local device may capture the video at 412 and perform additional processing before transmitting the video stream to the remote device. For instance, in one or more implementations, the local device may further process the video stream by, e.g., binning, applying SIFR, changing the frame rate, and the like, before transmitting a captured video stream the remote device. In one or more instances, the processing may be requested by the remote device, e.g., based on user preference, or may be enforced by the video conferencing application, e.g., for conserving bandwidth, improving light sensitivity, or any other suitable reasons.

Figure 5:
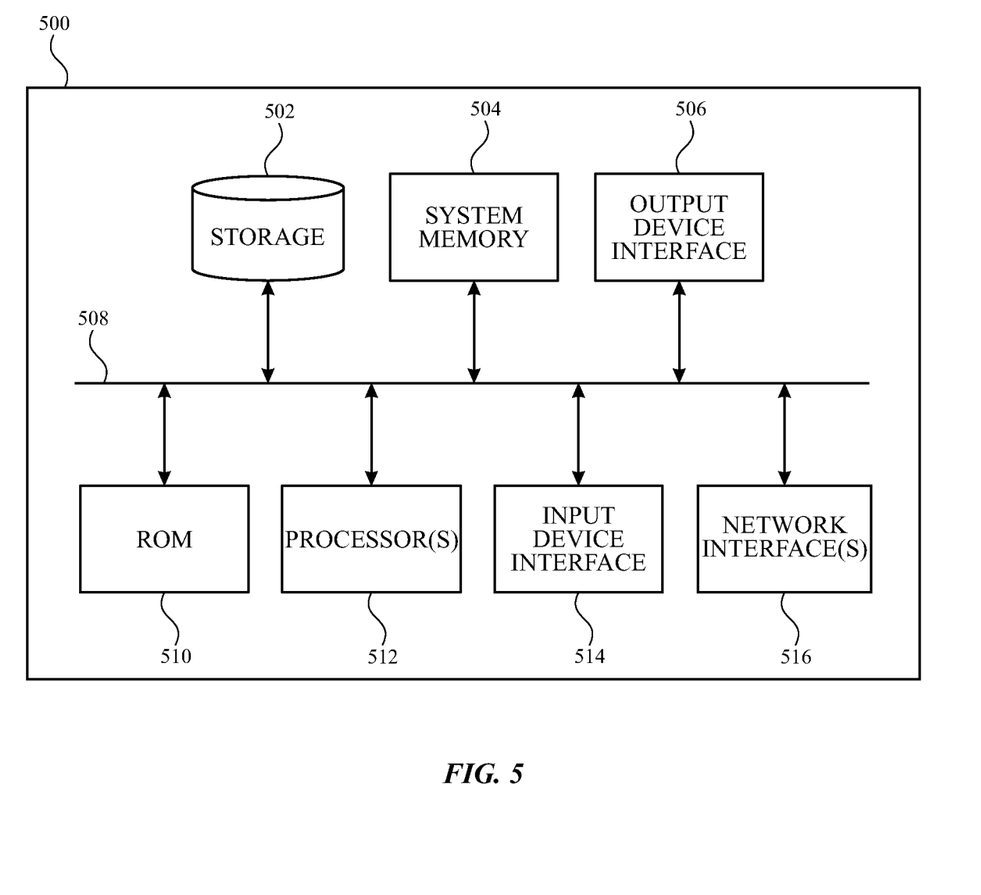
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of, any of the electronic devices 102-110, shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

In accordance with various aspects of the subject disclosure, a method includes receiving, at a local device, a requested camera format based on specifications of a display associated with a remote device. The remote device and the local device are devices participating in a video conference. The requested camera format includes a first resolution. Camera formats supported by a camera associated with the local device are determined. If a second resolution of a first camera format matches among the supported camera formats matches with the first resolution, the first camera format is selected for capturing the video stream by the camera. Otherwise, a second camera format among the supported camera formats is determined for capturing the video stream so as to maximize a field of view of the video stream relative to other camera formats supported by the camera.

In accordance with various aspects of the subject disclosure, a device may include a camera, at least one processor, and a memory including instructions that, when executed by the at least one processor, cause the at least one processor to: receive a requested camera format based on specifications of a display associated with a remote device, the requested camera format including a first resolution, the remote device participating in a video conference with the device; determine camera formats supported by the camera; determine whether a second resolution of a first camera format among the supported camera formats matches with the first resolution; in response to a determination that the second resolution matches the first resolution, selecting the first camera format for capturing the video stream by the camera; and in response to a determination that none of the supported camera formats match the requested camera format, determining a second camera format among the supported camera formats for capturing the video stream, the second camera format maximizing a field of view of the video stream relative to other camera formats supported by the camera.

In accordance with various aspects of the subject disclosure, a computer program product comprises code stored in a tangible computer-readable storage medium. The code comprises: code to receive a requested camera format based on specifications of a display associated with a remote device, the requested camera format including a first resolution, the remote device participating in a video conference with the device, and code to determine camera formats supported by the camera. The code further comprises code to receive specifications of a display associated with the remote device, and code to determine whether the attributes of the camera of the local device match with the specifications of the display of the remote device. The code further comprises code to determine whether a second resolution of a first camera format matches among the supported camera formats matches with the first resolution. If a second resolution of a first camera format matches among the supported camera formats matches with the first resolution, the first camera format is selected for capturing the video stream by the camera. Otherwise, a second camera format among the supported camera formats is determined for capturing the video stream so as to maximize a field of view of the video stream relative to other camera formats supported by the camera.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, by a local device, a requested camera format from a remote device, the requested camera format including a first resolution, the local device and the remote device participating in a video conference;
   determining, at the local device, that the requested camera format is not supported by a predefined configuration of a camera of the local device; and
   in response to determining that the requested camera format is not supported by the predefined configuration of the camera, capturing a video stream at the local device at a camera format that utilizes an entire width of a sensor area of the camera when a width dimension of the requested camera format is greater than a height dimension of the requested camera format and utilizes an entire height of the sensor area of the camera when the height dimension of the requested camera format is greater than the width dimension of the requested camera format.

2. The method of claim 1, wherein a display associated with the remote device is in a different orientation than a display associated with the local device.

3. The method of claim 1, further comprising transmitting the captured video stream to the remote device.

4. The method of claim 3, further comprising changing an attribute of the video stream prior to transmitting the video stream to the remote device, wherein changing the attribute increases video stream quality or efficiency of a transmission feed associated with the video stream.

5. The method of claim 4, wherein processing the video stream comprises at least one of: applying filters, binning, modifying frame rate, and applying scalable inman flash replacement (sIFR).

6. The method of claim 4, wherein processing the video stream comprises cropping the video stream.

7. The method of claim 1, wherein the predefined configuration corresponds to a look-up table listing multiple camera formats.

8. The method of claim 7, wherein the look-up table includes, for each camera format of the multiple camera formats, one or more of a video capture orientation, a video capture aspect ratio, or a video capture resolution.

9. The method of claim 1, wherein the camera comprises a square sensor.

10. A device comprising:
    a camera;
    at least one processor; and
    a memory including instructions that, when executed by the at least one processor, cause the at least one processor to:
    receive a requested camera format from a remote device, the requested camera format including a first resolution, the remote device participating in a video conference with the device;
    determine that the requested camera formats is not supported by a predefined configuration of the camera; and
    in response to determining that the requested camera format is not supported by the predefined configuration of the camera, capture a video stream at a camera format that utilizes an entire width of a sensor area of the camera when a width dimension of the requested camera format is greater than a height dimension of the requested camera format and utilizes an entire height of the sensor area of the camera when the height dimension of the requested camera format is greater than the width dimension of the requested camera format.

11. The device of claim 10, wherein the device has a default orientation and wherein the requested camera format is in a different orientation than the default orientation.

12. The device of claim 10, wherein the instructions further cause the processor to:
    transmit the captured video stream to the remote device; and
    prior to transmitting the captured video stream, change an attribute of the video stream, wherein changing the attribute increases video stream quality or efficiency of a transmission feed associated with the video stream.

13. The device of claim 12, wherein processing the video stream comprises at least one of: cropping the video stream to match the requested camera format, applying filters, binning, modifying frame rate, or applying scalable inman flash replacement (SIFR).

14. The device of claim 10, wherein the predefined configuration corresponds to a look-up table listing multiple camera formats.

15. The device of claim 14, wherein the look-up table includes, for each camera format of the multiple camera formats, one or more of a video capture orientation, a video capture aspect ratio, or a video capture resolution.

16. The device of claim 10, wherein the camera comprises a square sensor.

17. A computer program product comprising code stored in a tangible non-transitory computer-readable storage medium, the code comprising:
    code to receive a requested camera format from a remote device, the requested camera format including a first resolution, the remote device participating in a video conference with a local device;
    code to determine that the requested camera format is not supported by a predefined configuration of a camera associated with the local device; and
    code to capture, in response to determining that the requested camera format is not supported by the predefined configuration of the camera, a video stream at the local device at a camera format that utilizes an entire width of a sensor area of the camera when a width dimension of the requested camera format is greater than a height dimension of the requested camera format and utilizes an entire height of the sensor area of the camera when the height dimension of the requested camera format is greater than the width dimension of the requested camera format.

18. The computer program product of claim 17, wherein the local device has a default orientation, wherein the requested camera format is in a different orientation than the default orientation, and wherein the camera comprises a square sensor.

19. The computer program product of claim 17, further comprising:
    code to transmit the captured video stream to the remote device; and
    code to change an attribute of the video stream prior to transmitting the captured video stream, wherein changing the attribute increases video stream quality or efficiency of a transmission feed associated with the video stream.

20. The computer program product of claim 17, wherein the predefined configuration corresponds to a look-up table listing multiple camera formats, wherein the look-up table includes, for each camera format of the multiple camera formats, one or more of a video capture orientation, a video capture aspect ratio, or a video capture resolution.

\* \* \* \* \*